(12) United States Patent
Harms

(10) Patent No.: US 9,429,346 B2
(45) Date of Patent: Aug. 30, 2016

(54) EVAPORATIVE CHILLER

(71) Applicant: Aermist LLC, Las Vegas, NV (US)

(72) Inventor: Jonathan S. Harms, Las Vegas, NV (US)

(73) Assignee: Aermist LLC, Las Vegas, NV (US)

(*) Notice: Subject to any disclaimer, the term of this patent is extended or adjusted under 35 U.S.C. 154(b) by 667 days.

(21) Appl. No.: 13/789,632

(22) Filed: Mar. 7, 2013

(65) Prior Publication Data

US 2014/0208796 A1  Jul. 31, 2014

Related U.S. Application Data

(60) Provisional application No. 61/607,950, filed on Mar. 7, 2012.

(51) Int. Cl.
| | | |
|---|---|---|
| *F24F 1/02* | (2011.01) | |
| *B60H 3/00* | (2006.01) | |
| *F25B 39/02* | (2006.01) | |
| *F24F 5/00* | (2006.01) | |

(52) U.S. Cl.
CPC ............. *F25B 39/02* (2013.01); *F24F 5/0035* (2013.01); *F25B 2339/021* (2013.01)

(58) Field of Classification Search
CPC .. F24F 5/0035; F24F 1/02; F24F 2001/0088; B60H 1/00378; B60H 3/00; B60H 1/3202; F25B 39/02; Y02B 30/545; Y10T 29/49359
USPC ........ 62/314, 304, 259.4, 121, 316, 523, 89; 261/154, 155, 95, 100; 165/60, 54, 165/907, 104.26
See application file for complete search history.

(56) References Cited

U.S. PATENT DOCUMENTS

| | | | | |
|---|---|---|---|---|
| 1,949,522 A * | 3/1934 | Williams | .............. | F24F 5/0035 261/95 |
| 2,653,017 A | 9/1953 | Frost | | |
| 2,802,695 A | 8/1957 | Johnson | | |
| 3,043,573 A * | 7/1962 | Chandler | .................. | F24F 1/02 126/113 |
| 4,879,075 A * | 11/1989 | Hinton | .................. | F24F 5/0035 261/103 |
| 4,935,169 A * | 6/1990 | Ernst | ........................ | B64G 1/50 261/104 |
| 6,176,038 B1 * | 1/2001 | Morlier | .................. | A47G 7/047 47/81 |
| 6,450,132 B1 * | 9/2002 | Yao | ........................ | F28D 15/043 122/366 |
| 7,441,755 B2 * | 10/2008 | O'Leary | ............. | A01M 1/2044 239/44 |
| 7,499,632 B2 * | 3/2009 | Granger | .............. | A01M 1/2033 392/386 |
| 7,823,629 B2 * | 11/2010 | Rosenfeld | ............. | F28D 15/043 165/104.26 |
| 2006/0169439 A1 * | 8/2006 | Hong | .................... | F28D 15/046 165/104.26 |
| 2007/0163772 A1 * | 7/2007 | Bhatti | ..................... | F28F 1/126 165/202 |
| 2007/0256433 A1 * | 11/2007 | Bhatti | .................. | F24F 5/0035 62/121 |
| 2010/0254090 A1 * | 10/2010 | Trautman | ............. | F28D 15/046 361/704 |
| 2013/0306753 A1 | 11/2013 | O'Leary et al. | | |
| 2014/0144171 A1 * | 5/2014 | Smith | ..................... | F28F 25/04 62/304 |

* cited by examiner

*Primary Examiner* — Frantz Jules
*Assistant Examiner* — Martha Tadesse
(74) *Attorney, Agent, or Firm* — One3 IP Management, P.C.; Justin G. Sanders; Peter D. Weinstein

(57) ABSTRACT

An evaporative chiller utilizes an evaporative-cooled gypsum-ceramic casting to chill air passing through a passageway formed within the casting. Placed within an outer housing, the gypsum-ceramic casting has an outer wicking layer that maintains water saturation of the casting. Nano-evaporation from the casting surface into the air passageway cools the casting. Water is provided to the wicking layer from a supply connected to the outer housing. The chiller may be placed in-line within air ductwork, and blowers may be used to enhance the flow of air to be chilled through the evaporative chiller passageway.

20 Claims, 4 Drawing Sheets

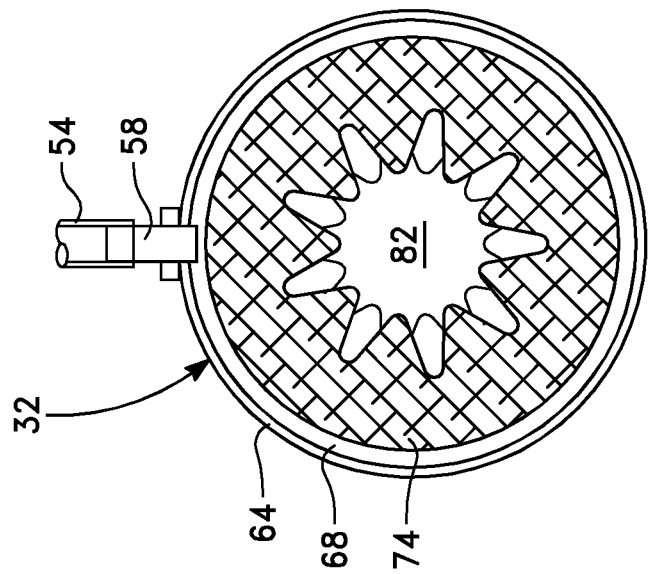
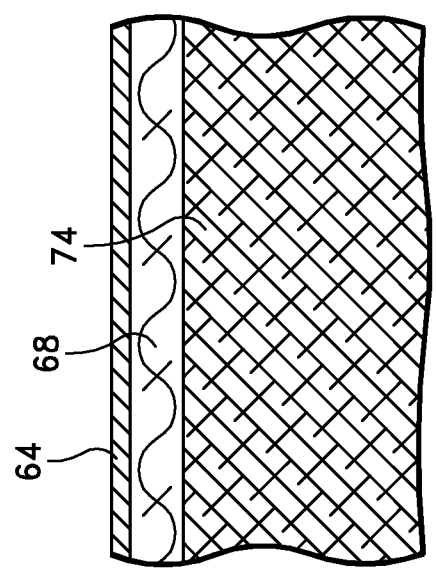
FIG. 4
FIG. 3

EVAPORATIVE CHILLER

RELATED APPLICATIONS

The present application claims the benefit of priority under 35 USC §119(e) to U.S. Provisional Application No. 61/607,950, filed on Mar. 7, 2012, which is incorporated by reference herein for all that it contains.

BACKGROUND OF THE INVENTION

1. Field of the Invention

The present invention relates to utilizing evaporative cooling to chill air, and, more particularly, to evaporative air coolers. More specifically, the present invention relates to an evaporative cooler utilizing a gypsum-ceramic casting to form a central air passageway; hydration and subsequent surface nano-evaporation chills the gypsum-ceramic casting, the chilled casting cooling air flowing within the passageway.

2. Description of the Related Art

The western quarter of the United States, from West Texas and Colorado to the California coastal range, is characterized by warm to hot summers with low relative humidity. Such a climate is ideal for evaporative coolers, which release water into the air to obtain an acceptable degree reduction in air temperature, depending upon the humidity of the outside air.

Relying upon the thermodynamics associated with the conversion of water from a liquid to a gas, the majority of evaporative coolers employ a fan or blower that draws hot outside air through a wet, porous media. So long as the outside ambient air remains dry (below 30% relative humidity), such coolers can provide cooling during the hottest days of summer at a fraction of the electrical power requirements of compressive refrigeration coolers.

Operation of an evaporative cooler has the blower drawing outside air into the housing, typically after the air first passes through a wetted media. Water in the wetted media evaporates into the dry air as it passes through, cooling and humidifying the air in the process. The blower then exhausts the cooled air from within the housing and into the areas to be cooled, displacing the warm ambient air with the cooled, conditioned, and humidified air.

Maintenance of an evaporative cooler requires periodic cleansing of the water reservoir. The number of operating hours between cleanings is primarily dependent upon the operational environment of the cooler. Such cleanings are important to maintain the efficiency of the unit, as well as to prevent an accumulation of undesirable molds, fungus, and odors.

Additionally, the evaporative coolers described above can only operate efficiently in the less-than-thirty-percent humidity areas of the country—essentially the Southwest. A need exists to provide the lower-power benefits of evaporative cooling in areas having relative humidity's of greater than 30%, without the requirement to move large volumes of air, the capital costs of the physical equipment, and the frequent cleaning requirements to maintain efficiency, air freshness, and avoid the dispersion of allergens during evaporative cooling operation.

SUMMARY OF THE INVENTION

The present invention utilizes a cooling chamber having a cast gypsum-ceramic matrix lining. During operation the lining is wetted, and nano-evaporation at the surface of the cast matrix lining results in a chilling of the entire cast matrix. Air is passed over the chilled cast matrix, causing the air to also become chilled. The cast matrix is provided with a highly convoluted surface to enhance the efficiency of heat transfer as the warmer air passes over the chilled cast matrix lining.

The cooling chamber is placed within an airflow duct, which is designed to allow an efficient amount of ambient air into the cooling chamber. Decreasing the size of cooler duct as well as minimizing the overall weight of the cooling unit promotes ease of installation while still achieving a desired degree of cooling.

An aspect of embodiments in accordance with the present invention is an evaporative chiller comprising: an outer housing, said outer housing having an inner surface that defines an air through-passage within said outer housing; a wicking layer attached to said inner surface of said outer housing; and a gypsum-ceramic casting layer extending over and attached to said wicking layer.

Another aspect of embodiments in accordance with the present invention is an evaporative chilling unit comprising: a cast matrix having an outer surface and an inner surface, said inner surface configured in a manner defining an air through-passage; a wicking layer formed over a substantial extent of said outer surface of said cast matrix; and an outer housing having an outer surface and an inner surface, said inner surface attached to said wicking layer.

These and other objects, aspects, and features of the present invention will be better understood from the following description of embodiments when read in conjunction with the appended drawing figures.

BRIEF DESCRIPTION OF THE DRAWINGS

Embodiments in accordance with the present invention are described below in connection with the accompanying drawings.

FIG. 3 is an enlarged cross-sectional view taken of the encircled area 3 of FIG. 2.

FIG. 4 is an end elevation view of a chilling unit in accordance with the present invention.

DETAILED DESCRIPTION OF THE PREFERRED EMBODIMENTS

The evaporative chiller is disclosed herein with respect to exemplary embodiments. The embodiments are disclosed for illustration of the evaporative chiller and a manner of operation, and are not limiting except as defined in the appended claims.

Figure 1:
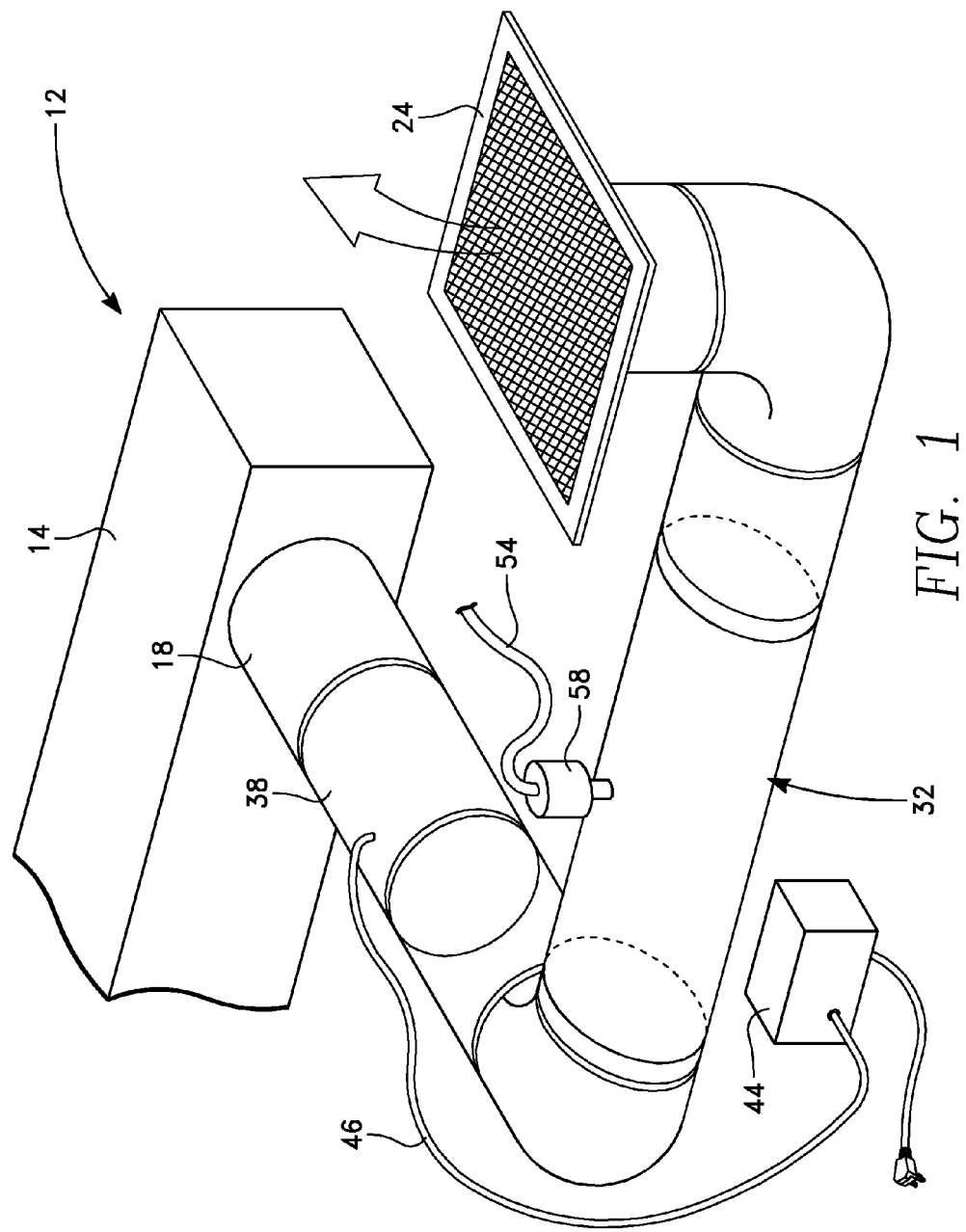
FIG. 1 is a partial perspective view of an airflow duct having a cylindrical chilling unit placed in-line in accordance with the present invention.

Reference is now made to the drawings wherein like structures refer to like parts throughout. In FIG. 1 an air chiller assembly 12 includes a source of chilled air from an air supply duct 14, which then passes into an enhanced chiller duct 18 and is discharged through a floor air register or ceiling air diffuser 18. A chilling unit 32 is located in-line the enhanced chiller duct 18, and is connected in a manner such that all air flowing within the chiller duct 18 is forced to pass through the chilling unit 32.

A blower 38 is also preferably located in-line the enhanced chiller duct 18, such as an electric-powered fan. Although shown as located upstream from the chilling unit 32 in FIG. 1, the blower 38 may also be located downstream from the chilling unit 32, resulting in air being pulled (instead of pushed) through the chilling unit 32. A power supply 44 and a length of electrical wiring 46 provide electrical power to the blower 38. A water supply line 54 extends from a source of water (not shown) to a connection with a water injector 58. In this manner a measured amount of water is provided to the chilling unit 32 during operation.

The various components of the air chiller assembly 12 in FIG. 1 are shown by way of example and not limitation. Additionally, depending upon the operational requirements more than one blower 38 can be provided, as well as multiple chilling units and water supply systems. The arrangement in a single enhanced chiller duct 18 can also be modified, providing multiple ducts, each having a separate discharge register or diffuser—or, again in accordance with operational design requirements, all such ducts can direct air through a single discharge register or diffuser. It is to be understood and appreciated that the present invention is not to be viewed as limited to a specific operational system configuration.

The components of the chilling unit 32 are best discussed with reference to FIGS. 2 and 3. An outer housing 64 is substantially uniformly cylindrically-shaped except for diameter step-downs at each end to form a pair of duct-connector segments 66. The outer housing 64 provides the structure about which a chilled cast matrix is constructed.

A wicking layer 68 is formed immediately adjacent an interior surface of the outer housing 64. After formation of the wicking layer 68 a gypsum-ceramic casting 74 is formed in situ to closely conform to the interior surface of the outer housing 64 and the wicking layer 68.

An inner casting surface 78 is provided and is preferably configured in a manner to obtain an increased surface area over which heat transfer can occur. The Figures display a plurality of roundish projections, termed "fingers" or "lobes," that extend towards a centrally-located air through-passageway 82. Other shapes could also be used and are considered as within the scope of the present invention. Such shapes are intended to increase the exposed surface area of the gypsum-ceramic casting 74 without creating undue restrictions to airflow.

Figure 2:
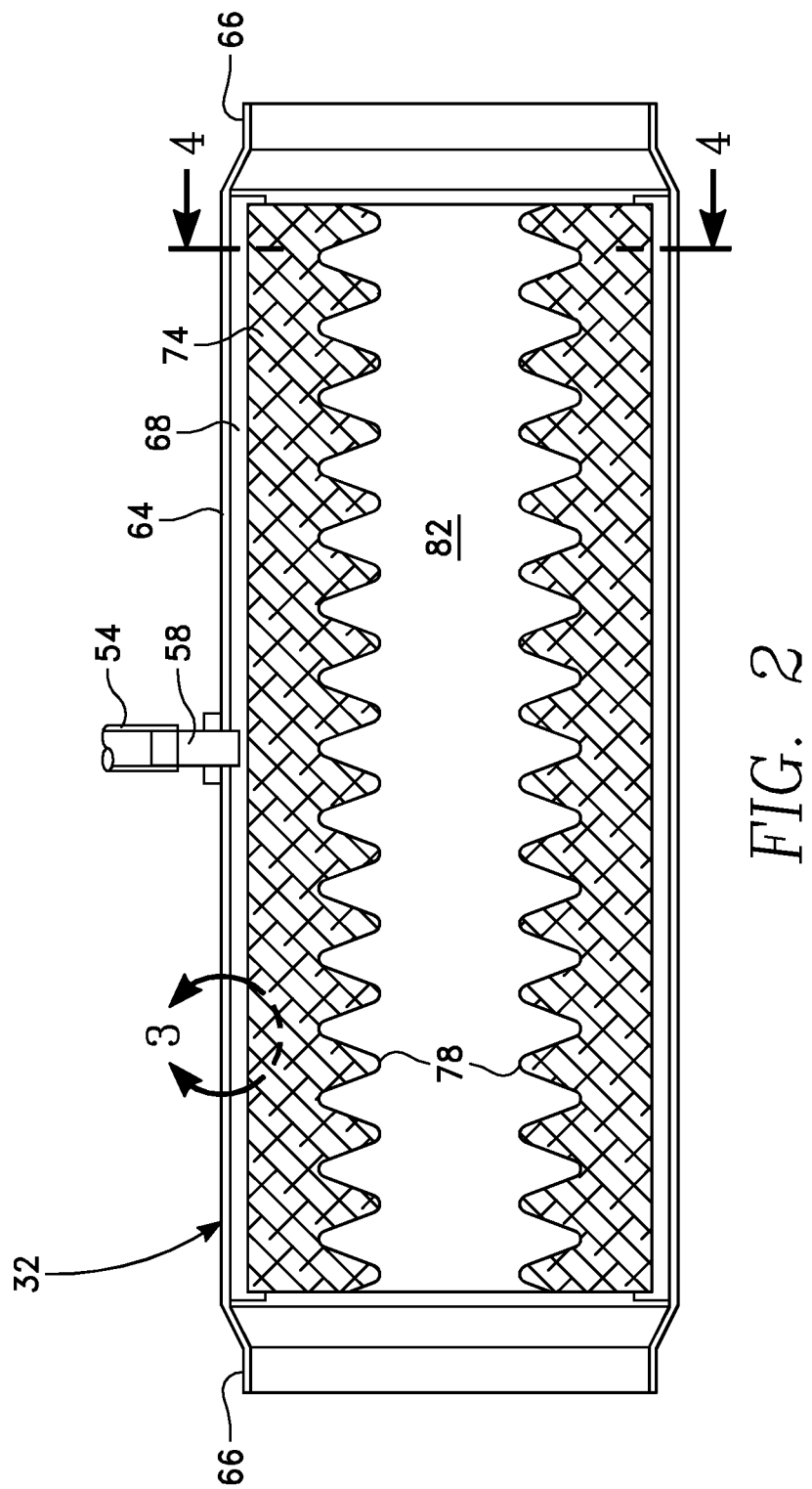
FIG. 2 is a cross-section of a chilling unit in accordance with the present invention.
Figure 6:
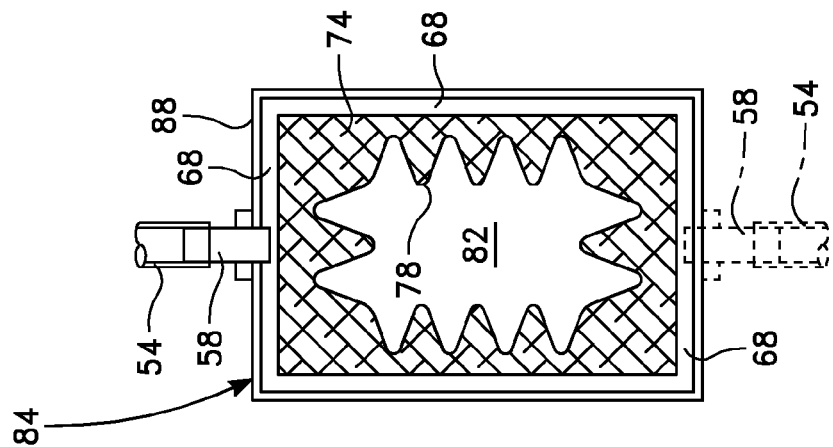
FIG. 6 is a partial side elevation view, with portions shown in phantom, of a rectangular chilling unit in accordance with the present invention.
Figure 5:
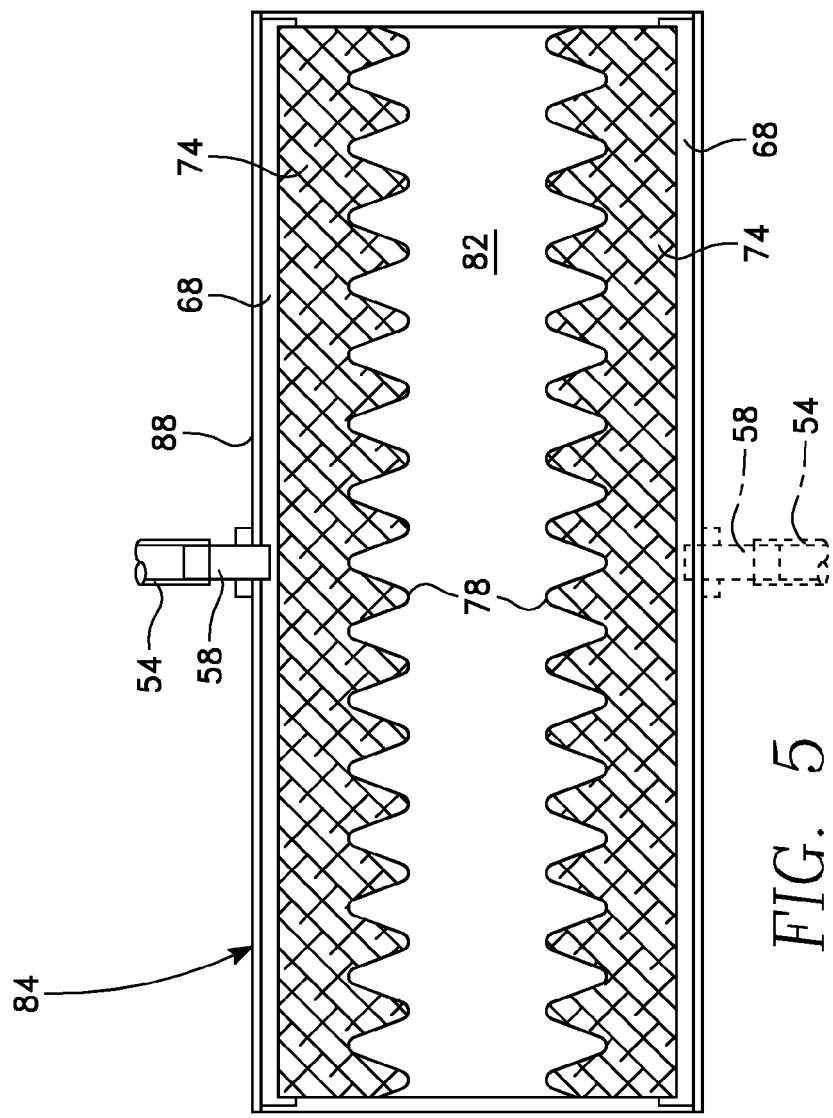
FIG. 5 is a cross-section, with portions shown in phantom, of an alternative rectangular embodiment of a chilling unit in accordance with the present invention.

As best shown in FIGS. 2 and 4 the outer housing 64 is configured in a cylindrical manner, one that best fits within the cylindrically-shaped enhanced chiller duct 18 shown in FIG. 1. The chilling unit 32 need not be limited to any one outer configuration, including cylindrical. FIGS. 5 and 6 depict a rectangular chilling unit 84, with an outer rectangular outer housing 88. The wicking layer 68 and gypsum casting 74 conform to the rectangular outer housing 88, with both extending to coverage on each of the four inner walls. Such rectangular chilling units permit installation of air chiller assemblies in locations having dimensional restrictions that make it difficult to install cylindrical chilling units—such as placement within walls.

FIGS. 5 and 6 depict the possibility of utilizing a pair of water lines 54 and water injectors 58. For moderately-sized chilling units only one such line and injector will provide sufficient water for operation, whether the chilling unit is cylindrical or rectangular in outer dimension. Larger units may require an additional water supply to adequately wet the wicking layer throughout the extent of the unit.

The air supply duct 14 in FIG. 1 may provide a supply of ambient, unconditioned air, or, as is more commonly the case, a supply of chilled air from a compressive refrigeration cooler. The additive effects of combining the chilling unit to further cool compressively-chilled air provide cooling efficiencies at very little added cost.

The enhanced chiller duct is designed to allow an efficient amount of air into the cooling chamber where it passes over a convoluted gypsum/ceramic matrix casting surface to achieve a desired degree of air cooling in the shortest length of tube possible. Decreasing the size of cooler duct as well as minimizing the overall weight of the cooling unit promotes ease of installation while still achieving a desired degree of cooling.

These design goals are achieved under the present invention by passing a maximum amount of air over individual cooling fingers of the chilled gypsum-ceramic casting. As has been briefly mentioned above, chilling of the casting occurs as a result of water within the saturated casting material evaporating into the air located immediately adjacent the casting surface—termed nano-evaporation. The entire casting is chilled through this process.

In a presently preferred embodiment, and by way of example and not limitation, the enhanced chilling unit 32 shown in FIG. 1 is preferably 10 inches in diameter and 24 inches in length. With airflow in the 400 to 700 cfm range a chilling unit so-dimensioned is capable of cooling and maintaining a working space of, plus/minus 1,000 cubic feet.

The manner of fabrication is best understood by viewing the Figures along with the following explanation. A metal air duct, such as those manufactured by the Standpipe Company or one of its competitors, may be used to fabricate the chilling unit. It is also contemplated to form the outer housing out of a plastic, such as KYDEX® brand thermoplastics or ABS (acrylonitrile butadiene styrene) thermoplastic.

The inner wall of the air duct provides a surface against which can be formed the evaporative cooling engine. A first layer is obtained by adhering a high-absorption microfiber material (such as Starfiber® brand cloths, manufactured by Aqua Star, Inc., of Paramount, Calif.), using an adhesive such as one manufactured by the 3M Company of Minneapolis, Minn. In a presently preferred embodiment 100% of the inner duct surface is covered by this microfiber material, which provides a wicking surface for the casting. It is also contemplated to recess the microfiber material from the areas of the inner walls immediately adjacent the duct-connector segments to minimize water leakage into the connecting ducts.

After application of the microfiber to the inner wall of the duct a gypsum-ceramic casting is formed in situ to closely conform to the interior surface of the duct, overlying the microfiber layer. This unique molding application utilizes a cold-casted gypsum-based material in combination with a ceramic material that is formed from heated and expanded sand.

In a presently preferred embodiment the mixture consists of 2 parts gypsum to 1 part heated/expanded sand, providing a material of optimal weight and efficiency for casting. The resulting ceramic matrix is a light-weight castable material—providing strength as well as weight savings. Additionally, this gypsum-ceramic casting is provided an internal structure that permits a faster migration of water through the matrix, as well as the capability to retain more water when fully saturated. Casting gypsum such as the well-known HYDRO-STONE® brand, as well as other known gypsums, are suitable for use in forming the gypsum-ceramic casting matrix.

This same optimal mixture ratio also provides a casting material that can sufficiently bond to the microfiber duct liner material. It is desired that the microfiber liner be encapsulated by the casting material to insure the formation of a dependable liquid pathway into the cast material. It is this encapsulation process that forms the core method of introducing sufficient liquid into the chilling unit in an appropriate manner to effectuate the efficient nano-evaporative cooling of the gypsum-ceramic casting and, in turn, the air flowing through the duct.

It is important that water not "flood" the microfiber layer, and in a presently preferred embodiment a water feed injector is attached to the outer surface of the duct, with an orifice formed therein to provide a passageway for water to flow from the water line to the inner microfiber layer. A water reservoir is preferably provided as part of the water injector, with a float regulator utilized to obtain additional water from the water line as needed to maintain a desired liquid level in the feed reservoir and injector. For the enhanced chilling unit discussed above a feed reservoir having dimensions of preferably 7 inches by 4 inches provides adequate liquid for efficient operation of such a cooling device.

A presently preferred alternative embodiment utilizes a water line with a timer and a variable control valve to supply evaporative water to the chilling unit. In much the same manner as drip irrigation provides controlled amounts of water to plants, so too, the timer and metered water mechanisms supply water to the chilling unit on a measured basis over time, eliminating the requirement to maintain a standing reservoir of water.

The present chilling unit provides many advantages over both the compressive refrigeration coolers and the evaporative coolers presently available. As is apparent from the above-discussion and Figures the chilling unit of the present invention can be considered a portable cooler that can easily be added to an existing home or commercial environment. These chilling units are relatively small and lightweight, permitting a single person to transport this system to where it is needed for temporary cooling or for placement in a more permanent installation.

In presently preferred embodiments the inventive cooler will be provided in three different configurations. A first configuration utilizes a single chilling unit that is placed in an existing air conditioning duct adjacent the opening to the room. A small duct fan can optionally be added adjacent the chilling unit to increase airflow into the space to be cooled.

A second configuration utilizes multiple chilling units that can be arranged in parallel or series. When placed in a series or end-to-end configuration a high velocity fan attached to the intake end can be used in tandem with a directional airflow nozzle at the discharge end to affect enhanced cooling outflow. Alternatively, the multiple units can be arranged in a parallel manner, providing a "bundle" of enhanced chiller ducts that direct multiple streams of cooled air to a desired location.

A third configuration utilizes a smaller-sized chilling unit, of a size that might be suitable for the use of solar power, providing spot cooling over a smaller space. By way of example and not limitation, such a configuration might be useful to cool a small shelter housing an animal(s). It is to be understood and appreciated that custom cooling configurations might use one, two or all of these techniques to provide such cooled air, in both quantity and direction, as might be required for a particular environment.

The transport of the present cooling device does not require enlargement of doors and hallways in existing buildings, and within a room, its placement—temporary or more permanent, is easily accomplished. For example, in a garage-type workspace the dual chamber chilling unit would be installed in a manner permitting the user to actuate the unit when the cooling of a specific work area is required (e.g., a worktable, assembly line, and the like).

For a more permanent installation a single chilling unit device can be used to enhance the cooling already provided by a conventional compressor-type air conditioner. Placement of the single chilling unit in an existing ac duct requires very little modification. A source of water can be provided using a low-flow water tube of the type typically used to supply water to home refrigerators. The resulting duct-located unit provides a much more efficient room cool-down, by further chilling the incoming cooled air, than is able to occur using the typical unassisted ac cooling system.

As various changes could be made in the above constructions without departing from the scope of the invention, it is intended that all the matter contained in the above description or shown in the accompanying drawings shall be interpreted as illustrative and not in a limiting sense.

What is claimed is:

1. An evaporative chiller comprising:
   an outer housing having an inner surface that defines an air passage extending through the outer housing;
   a wicking layer formed immediately adjacent and directly attached to at least a portion of the inner surface of the outer housing;
   a gypsum-ceramic casting layer formed immediately adjacent and directly attached to an inner surface of the wicking layer, thereby sandwiching the wicking layer between the gypsum-ceramic casting layer and the inner surface of the outer housing, an exposed inner surface of the gypsum-ceramic casting layer defining a substantially tubular-shaped air passage extending through the gypsum-ceramic casting layer in fluid communication with the air passage of the outer housing; and
   the outer housing providing an at least one water-feed aperture through which a water injector extends a distance into the outer housing so as to be in fluid communication with the wicking layer, the water injector connected to a water supply line extending from a source of water;
   whereby, water is selectively delivered to the wicking layer through the water line which, in turn, permeates the gypsum-ceramic casting layer and evaporates into the air located immediately adjacent the exposed inner surface of the gypsum-ceramic casting layer, thereby affecting the temperature of the air moving through the air passage of the gypsum-ceramic casting layer.

2. The evaporative chiller of claim 1, wherein said gypsum-ceramic casting layer is formed in situ and closely conforms to said inner surface of said outer housing.

3. The evaporative chiller of claim 1, wherein said inner surface of said gypsum-ceramic casting layer comprises a convoluted surface.

4. The evaporative chiller of claim 3, wherein said convoluted surface comprises a plurality of roundish finger or lobe projections extending inwardly into the air passage of the gypsum-ceramic casting layer.

5. The evaporative chiller of claim 1, wherein said gypsum-ceramic casting layer is attached to said wicking layer in a manner bonding said gypsum-ceramic casting layer to said wicking layer and forming a liquid pathway from said wicking layer into said gypsum-ceramic casting layer.

6. The evaporative chiller of claim 1, wherein said wicking layer comprises an absorbent microfiber material capable of being saturated with water.

7. The evaporative chiller of claim 1, wherein said outer housing is of cylindrical configuration.

8. The evaporative chiller of claim 1, wherein said outer housing is of rectangular configuration.

9. The evaporative chilling unit of claim 1, wherein said gypsum-ceramic casting layer consists of two parts gypsum to one part ceramic material formed from heated and expanded sand.

10. The evaporative chilling unit of claim 1, wherein the entire inner surface of the outer housing is covered by the wicking layer, which provides a wicking surface for the gypsum-ceramic casting layer.

11. The evaporative chilling unit of claim 1, further comprising an at least one blower in fluid communication with the air passage of the outer housing and configured for moving air through the air passage.

12. The evaporative chiller unit of claim 1, further comprising an at least one compressive refrigeration cooler in fluid communication with the air passage of the outer housing and configured for chilling the air before said air enters the air passage.

13. The evaporative chiller of claim 1, wherein the outer housing is configured for being installed in-line with an existing air conditioning duct.

14. The evaporative chiller unit of claim 1, wherein the outer housing is substantially uniformly cylindrically-shaped except for diameter step-downs at opposing ends of the outer housing, thereby forming a pair of duct-connector segments.

15. The evaporative chiller unit of claim 1, wherein the outer housing provides a pair of water-feed apertures through which a pair of water injectors extend a distance into the outer housing so as to be in fluid communication with the wicking layer, the water injectors being connected to a water supply line extending from a source of water.

16. The evaporative chiller unit of claim 1, further comprising a timer and a variable control valve in fluid communication with the water line for regulating the amount of water that is provided to the at least one water injector.

17. The evaporative chiller unit of claim 1, wherein the outer housing has a diameter of approximately ten inches and a length of approximately twenty-four inches.

18. The evaporative chiller unit of claim 1, wherein the outer housing is constructed of metal.

19. An evaporative chiller comprising:
an outer housing having an inner surface that defines an air passage extending through the outer housing;
a wicking layer formed immediately adjacent and directly attached to at least a portion of the inner surface of the outer housing;
a gypsum-ceramic casting layer formed immediately adjacent and directly attached to an inner surface of the wicking layer, thereby sandwiching the wicking layer between the gypsum-ceramic casting layer and the inner surface of the outer housing, an exposed inner surface of the gypsum-ceramic casting layer defining a substantially tubular-shaped air passage extending through the gypsum-ceramic casting layer in fluid communication with the air passage of the outer housing;
the inner surface of the gypsum-ceramic casting layer providing a convoluted surface comprising a plurality of roundish finger or lobe projections extending inwardly into the air passage of the gypsum-ceramic casting layer;
the outer housing providing an at least one water-feed aperture through which a water injector extends a distance into the outer housing so as to be in fluid communication with the wicking layer, the water injector connected to a water supply line extending from a source of water;
whereby, water is selectively delivered to the wicking layer through the water line which, in turn, permeates the gypsum-ceramic casting layer and evaporates into the air located immediately adjacent the exposed inner surface of the gypsum-ceramic casting layer, thereby affecting the temperature of the air moving through the air passage of the gypsum-ceramic casting layer.

20. An evaporative chiller comprising:
an outer housing having an inner surface that defines an air passage extending through the outer housing;
a wicking layer formed immediately adjacent and directly attached to at least a portion of the inner surface of the outer housing;
a gypsum-ceramic casting layer formed immediately adjacent and directly attached to an inner surface of the wicking layer, thereby sandwiching the wicking layer between the gypsum-ceramic casting layer and the inner surface of the outer housing, an exposed inner surface of the gypsum-ceramic casting layer defining a substantially tubular-shaped air passage extending through the gypsum-ceramic casting layer in fluid communication with the air passage of the outer housing;
the outer housing providing an at least one water-feed aperture through which a water injector extends a distance into the outer housing so as to be in fluid communication with the wicking layer, the water injector connected to a water supply line extending from a source of water; and
an at least one compressive refrigeration cooler in fluid communication with the air passage of the outer housing and configured for chilling the air before said air enters the air passage;
whereby, water is selectively delivered to the wicking layer through the water line which, in turn, permeates the gypsum-ceramic casting layer and evaporates into the air located immediately adjacent the exposed inner surface of the gypsum-ceramic casting layer, thereby affecting the temperature of the air moving through the air passage of the gypsum-ceramic casting layer.

* * * * *